United States Patent
Lojek et al.

(10) Patent No.: US 12,447,521 B2
(45) Date of Patent: *Oct. 21, 2025

(54) INTERNAL HYDROFORMING METHOD FOR MANUFACTURING HEAT PIPE WICKS UTILIZING A HOLLOW MANDREL AND SHEATH

(71) Applicant: Westinghouse Electric Company LLC, Cranberry Township, PA (US)

(72) Inventors: John Lojek, Valencia, PA (US); Matthew M Swartz, Claridge, PA (US); William A. Byers, Murrysville, PA (US); Gregory A. Kustra, Gibsonia, PA (US); David M. Gross, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 293 days.

This patent is subject to a terminal disclaimer.

(21) Appl. No.: 17/996,716

(22) PCT Filed: Apr. 19, 2021

(86) PCT No.: PCT/US2021/027959
§ 371 (c)(1),
(2) Date: Oct. 20, 2022

(87) PCT Pub. No.: WO2021/216446
PCT Pub. Date: Oct. 28, 2021

(65) Prior Publication Data
US 2023/0226587 A1    Jul. 20, 2023

Related U.S. Application Data (60) Provisional application No. 63/012,725, filed on Apr. 20, 2020.

(51) Int. Cl.
*B21D 26/033* (2011.01)
*B21D 26/051* (2011.01)
(Continued)

(52) U.S. Cl.
CPC ......... *B21D 26/033* (2013.01); *B21D 26/051* (2013.01); *B21D 39/04* (2013.01);
(Continued)

(58) Field of Classification Search
CPC ............. B21D 26/051; B21D 39/203; Y10T 29/49353; Y10T 29/49805; B23P 2700/09
See application file for complete search history.

(56) References Cited

U.S. PATENT DOCUMENTS

| | | |
|---|---|---|
| 3,681,843 A | 8/1972 | Arcella et al. |
| 3,964,902 A | 6/1976 | Fletcher et al. |

(Continued)

FOREIGN PATENT DOCUMENTS

| | | | | |
|---|---|---|---|---|
| DE | 102004012996 A1 * | 8/2004 | ........... | B21D 26/051 |
| JP | S5596890 A | 7/1980 | | |

(Continued)

OTHER PUBLICATIONS

Translation of JP-58156191-A (Year: 1983).*
(Continued)

*Primary Examiner* — John J DeRusso
(74) *Attorney, Agent, or Firm* — K&L Gates LLP (57) ABSTRACT

A forming assembly for forming a wick is disclosed. The forming assembly includes a tube inflatable to an inflated configuration. A wick mesh is configured to be wrapped about the tube. The forming assembly further includes a sheath positionable about the tube and the wick mesh. The
(Continued)

tube and the sheath are configured to compress the wick mesh and form the wick based on the tube inflating towards the inflated configuration.

8 Claims, 5 Drawing Sheets

(51) Int. Cl.
    *B21D 39/04*     (2006.01)
    *B21D 39/20*     (2006.01)
    *B21D 53/06*     (2006.01)
    *B23P 15/26*     (2006.01)
    *F28D 15/04*     (2006.01)

(52) U.S. Cl.
    CPC ........... *B21D 39/203* (2013.01); *B21D 53/06* (2013.01); *B23P 15/26* (2013.01); *F28D 15/046* (2013.01); *B23P 2700/09* (2013.01); *F28F 2275/125* (2013.01); *Y10T 29/49353* (2015.01); *Y10T 29/49805* (2015.01)

(56) References Cited

U.S. PATENT DOCUMENTS

| | | | |
|---|---|---|---|
| 4,186,796 A | 2/1980 | Usui | |
| 4,195,390 A * | 4/1980 | Amen | B21D 39/203 |
| | | | 29/523 |
| 11,780,122 B2 * | 10/2023 | Lojek, III | B29C 43/3642 |
| | | | 264/570 |
| 2006/0213061 A1 | 9/2006 | Wu et al. | |
| 2011/0120585 A1 | 5/2011 | Hur et al. | |
| 2018/0229766 A1 * | 8/2018 | Reddehase | B60G 7/003 |
| 2024/0017448 A1 * | 1/2024 | Lojek, III | F28D 15/046 |

FOREIGN PATENT DOCUMENTS

| | | | |
|---|---|---|---|
| JP | 58156191 A | * | 9/1983 |
| JP | S58-156191 A | | 9/1983 |
| JP | H09119789 A | | 5/1997 |
| SU | 1611678 A1 | | 12/1990 |
| WO | 2017135621 A2 | | 8/2017 |

OTHER PUBLICATIONS

Translation of SU 1611678 (Year: 1990).*
Translation of DE-102004012996-A1 (Year: 2004).*
International Search Report and Written Opinion for International PCT Application No. PCT/US2021/027959, dated Aug. 3, 2021.

* cited by examiner

INTERNAL HYDROFORMING METHOD FOR MANUFACTURING HEAT PIPE WICKS UTILIZING A HOLLOW MANDREL AND SHEATH

CROSS-REFERENCE TO RELATED APPLICATIONS

This application is a U.S. National Stage Entry under 35 U.S.C. § 371 of International Patent Application No. PCT/US2021/027959, entitled INTERNAL HYDROFORMING METHOD FOR MANUFACTURING HEAT PIPE WICKS UTILIZING A HOLLOW MANDREL AND SHEATH, filed Apr. 19, 2021, which claims benefit under 35 U.S.C. § 119 (e) to U.S. Provisional Application Ser. No. 63/012,725 filed Apr. 20, 2020, the entire disclosures of which are hereby incorporated by reference herein.

GOVERNMENT CONTRACT

This invention was made with government support under Contract DE-NE0008853 awarded by the Department of Energy. The government has certain rights in the invention.

BACKGROUND

This invention relates generally to heat pipes used in heat transfer systems, and more particularly, to wicks within the heat pipes that are configured to transfer the working fluid of the heat pipe from a condenser region of the heat pipe to an evaporator region.

Figure 1:
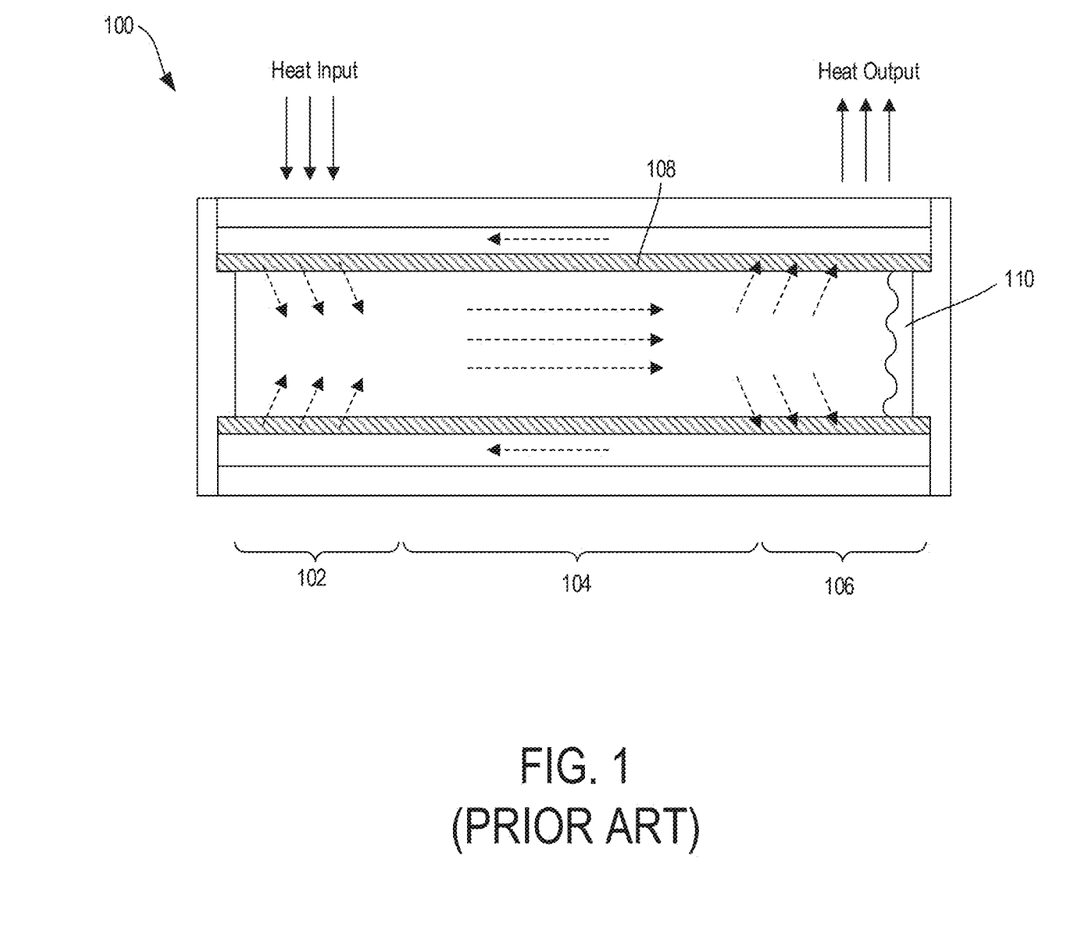
FIG. 1 illustrates working fluid moving through a heat pipe.

A heat pipe is a hermetically sealed, two-phase heat transfer component used to transfer heat from a primary side (evaporator section) to a secondary side (condenser section). FIG. 1, as an example, illustrates a heat pipe 100 comprising the aforementioned evaporator section 102 and condenser section 106, along with an adiabatic section 104 extending therebetween. The heat pipe 100 further includes a working fluid (such as water, liquid potassium, sodium, or alkali metal) and a wick 108. In operation, the working fluid is configured to absorb heat in the evaporator section 102 and vaporize. The saturated vapor, carrying latent heat of vaporization, flows towards the condenser section 106 through the adiabatic section 104. In the condenser section 106, the vapor condenses into a liquid pool 110 and gives off its latent heat. The condensed liquid is then returned to the evaporator section 102 through the wick 108 by capillary action. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

In nuclear systems, heat pipes are utilized by placing the evaporator section of the heat pipe within the reactor core containing nuclear fuel and the condenser section is placed near heat exchangers. The nuclear fuel vaporizes the working fluid and heat exchangers absorb the latent heat at the condenser section. Example heat pipes in nuclear applications are described in U.S. Pat. Nos. 5,684,848, 6,768,781, and U.S. Patent Application Publication No. 2016/0027536, all of which are hereby incorporated by reference herein in their entireties.

Another example use for heat pipes in nuclear systems is with micro-reactors, which are nuclear reactors that generate less than 10 MWe and are capable of being deployed for remote applications. These micro-reactors can be packaged in relatively small containers, operate without active involvement of personnel, and operate without refueling/replacement for a longer period than conventional nuclear power plants. One such micro-reactor is the eVinci Micro Reactor system, designed by Westinghouse Electric Company. The eVinci system is a heat pipe cooled reactor power system that utilizes heat pipes to act as passive heat removal devices that efficiently move thermal energy out of the reactor core to heat exchangers.

The heat pipes used in the micro-reactors experience extreme operating temperatures (>850° C.) and requires an internal wick that is made from materials that can withstand these temperatures and are compatible with the working fluid. This wick can be constructed from a wire mesh that is rolled and diffusion bonded together into a tube-like structure. The wick tube allows for the working fluid within the heat pipe to pass through it radially (such as after the latent heat is given off and the working fluid is absorbed by the wick) and along its axis (transferring the working fluid back toward the evaporator section with capillary action) while remaining rigid.

Manufacturing a wick for insertion into a heat pipe requires a highly complex and detailed process. At a very high level, a wick is manufactured by rolling a sheet of woven wick mesh material into a desired shape, compressing materials (such as tubing) into the wick to forcefully deform the wick into the desired shape, diffusion bonding the mesh together in an oven at vacuum levels while maintaining the wick in a compressed state, and then removing materials used to hold the wick in the compressed state during diffusion bonding. An example of this method for wick forming method are described in U.S. Pat. No. 3,964,902, titled "METHOD OF FORMING A WICK FOR A HEAT PIPE", the entire disclosure of which is hereby incorporated by reference herein.

Known methods of forming a rolled wire mesh wick in preparation for diffusion bonding utilize a copper mandrel and sheath which is drawn down using a drawing operation to permanently deform both a copper mandrel and sheath to compress the wick mesh to its final dimension. Copper drawing, however, requires different drawing die sizes to be used every time a newly sized wick is formed. This is time consuming and a costly process to change die designs multiple times, especially considering that the design of wick geometries is continuously changing as reactor designs change.

It is the goal of the present disclosure to provide an assembly and method for forming wicks at significantly lower cost and time than other publically documented methods, such as the copper drawing process, described above.

SUMMARY

In various embodiments, a forming assembly for forming a wick is disclosed. The forming assembly includes a tube inflatable to an inflated configuration. A wick mesh is configured to be wrapped about the tube. The forming assembly further includes a sheath positionable about the tube and the wick mesh. The tube and the sheath are configured to compress the wick mesh and form the wick based on the tube inflating towards the inflated configuration.

In various embodiments, a method of forming a wick using a mandrel is disclosed. The method includes positioning a wick mesh about the mandrel, positioning a sheath about the mandrel and the wick mesh, and coupling a first fitting to the mandrel. The first fitting includes an adapter configured to couple with a source of pressure. The method further includes pressurizing the mandrel with the source of pressure to hydraulically expand the mandrel such that that mandrel compresses the wick mesh against the sheath and forms the wick.

In various embodiments, a forming assembly for forming a wick is disclosed. The forming assembly includes an inner enclosure hydraulically expandable to an expanded configuration. A wick mesh is configured to be wrapped about the inner enclosure. The forming assembly further includes an outer enclosure positionable about the inner enclosure and the wick mesh. The inner enclosure and the outer enclosure are configured to compress the wick mesh and form the wick based on the inner enclosure hydraulically expanding towards the expanded configuration.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Applicant of the present application owns the following patent applications that were filed concurrently herewith and which are hereby incorporated by reference in their respective entireties herein:

U.S. application Ser. No. 16/853,270, filed Apr. 20, 2020, entitled "INTERNAL HYDROFORMING METHOD FOR MANUFACTURING HEAT PIPE WICKS", by inventors John Lojek III, et al.

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 2:
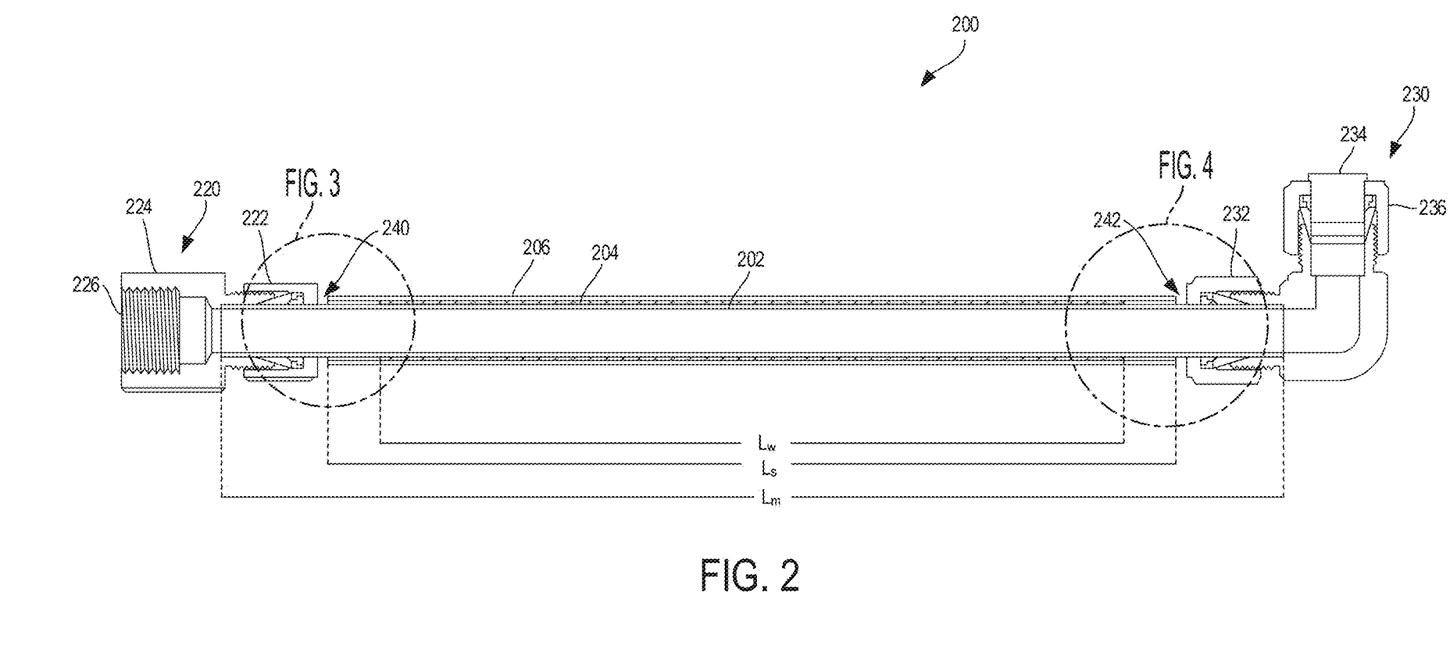
FIG. 2 illustrates a forming assembly, according to at least one aspect of the present disclosure.

FIG. 2 illustrates a forming assembly 200, in accordance with at least one aspect of the present disclosure. The forming assembly 200 includes a mandrel, tube, or inner enclosure 202. The mandrel 202 can be any suitable, hollow shape, such as a circular tube, a square tube, or an oval tube, as examples. For circular tube mandrels 202, the outside diameter can be 0.5 inches, as an example. Other embodiments are envisioned where the mandrel 202 has an outside diameter of more or less than 0.5 inches.

The mandrel 202 is fully annealed such that, when pressure is applied to an internal surface of the mandrel 202, as will be described in more detail below, the mandrel 202 can deform and inflate, or hydraulically expand, outwardly. Fully annealing the mandrel 202 allows the mandrel 202 to inflate without rupturing. The mandrel 202 can be fabricated out of any suitable material, such as copper, carbon steel, or any other suitable material that can be deformed and inflate upon pressure being applied to an inner surface of the mandrel 202. The mandrel 202 can be fabricated with any suitable thickness, such as about 0.032 inches, as an example. Other embodiments are envisioned where the mandrel 202 includes a thickness of more or less than 0.032 inches. In one embodiment, the mandrel 202 can have a thickness between about 0.03 and 0.04 inches. In another embodiment, the mandrel 202 can have a thickness between about 0.02 and 0.05 inches.

Figure 3:
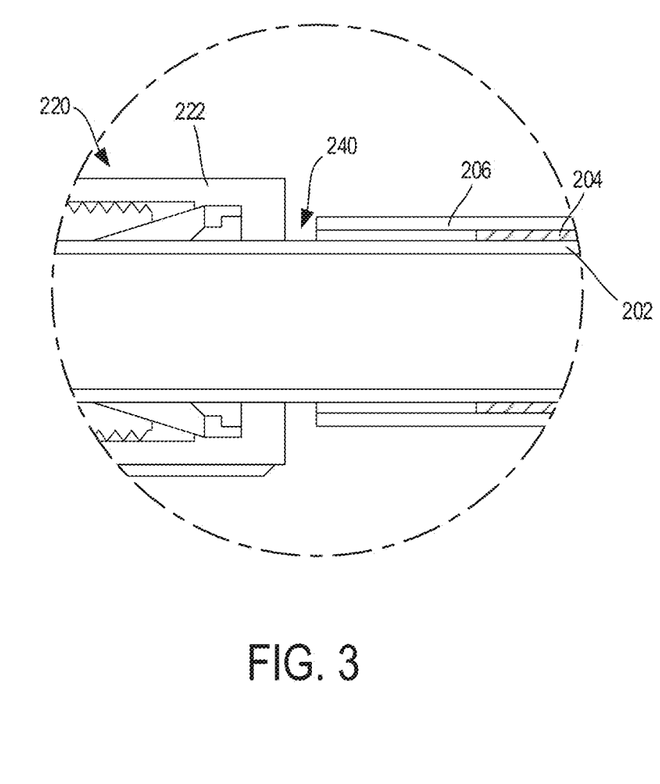
FIG. 3 illustrates a detailed view of a first portion of the forming assembly of FIG. 2, according to at least one aspect of the present disclosure.
Figure 4:
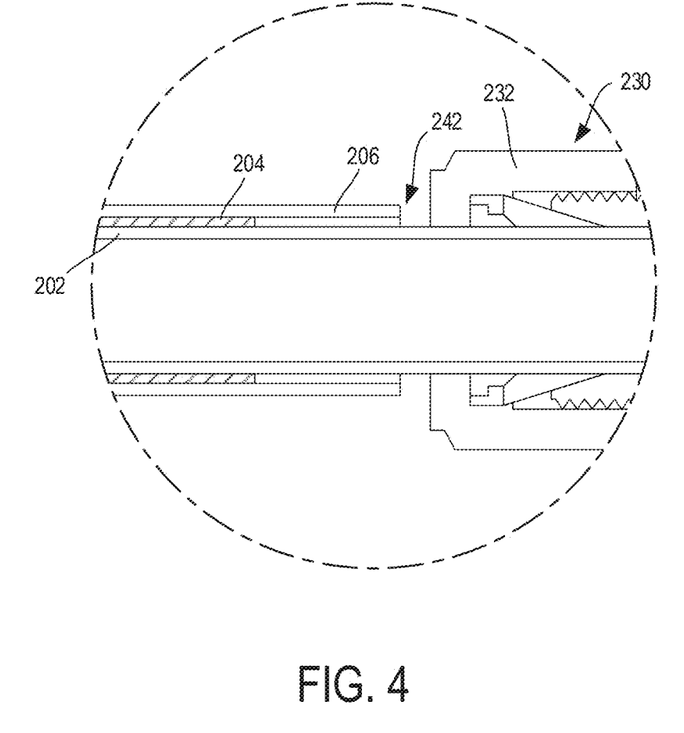
FIG. 4 illustrates a detailed view of a second portion of the forming assembly of FIG. 2, according to at least one aspect of the present disclosure.

A sheet, or a plurality of layered sheets, of wick mesh 204 can be tightly rolled or wrapped about the mandrel 202. The wick mesh 204 can be fabricated out of any suitable material in which a wick is desired to be formed, such as stainless steel (316 stainless steel, as an example) or molybdenum, as examples. As shown in FIGS. 2-4, the length of the wick mesh 204 is cut shorter than the length of the mandrel 202. As an example, the length of the wick mesh 204 $L_w$ can be about 48 inches and the length of the mandrel $L_m$ can be about 52 inches. Other lengths of the wick mesh 204 and mandrel 202 are contemplated. In various embodiments, the length of the wick mesh 204 $L_w$ and the length of the mandrel $L_m$ can be identical, or at least substantially identical. In one example embodiment, the length of the wick mesh 204 $L_w$ can be 75% of the length of the mandrel $L_m$. In one example embodiment, the length of the wick mesh 204 $L_w$ can be 50% of the length of the mandrel $L_m$. In one example embodiment, the length of the wick mesh 204 $L_w$ can be 25% of the length of the mandrel $L_m$. In one example embodiment, the length of the wick mesh 204 $L_w$ can be greater than the length of the mandrel $L_m$.

The forming assembly 200 can further includes a sheath, outer tube, or outer enclosure 206. The sheath 206 can be positioned about the mandrel 202 and the wick mesh 204. In operation, as described above, pressure can be applied to an internal surface of the mandrel 202. The mandrel 202, along with the wick mesh 204 wrapped about the mandrel 202, can expand outwardly towards an inside surface of the sheath 206. The sheath 206 and the mandrel 202 can compress and deform the wick mesh 204 therebetween, forming the wick.

The sheath 206 can define a final, outside diameter or shape or the wick. The sheath 206 may comprise any suitable cross-section shapes that may be desired of a wick, such as a circle, an oval, a square, or any shape in which a wick may desired. For circular tube sheaths 206, the outside diameter can be about 0.625 inches, as an example. Other embodiments are envisioned where the sheath 206 has an outside diameter of more or less than 0.625 inches. In one embodiment, the sheath 206 can have an outside diameter between about 0.6 and 0.7 inches. In another embodiment, the sheath 206 can have an outside diameter between about 0.5 and 0.8 inches.

As shown in FIGS. 2-4, the length of the sheath $L_s$ can be shorter than the length of the mandrel $L_m$, but greater than the length of the wick mesh $L_w$. As an example, the length of the sheath $L_s$ can be about 50 inches. Having a sheath 206 that is greater in length than the wick mesh 204 can prevent the wick mesh 204 from expanding outwardly from between the sheath 206 and the mandrel 202, helping maintain a uniform shape of the wick. In alternative embodiments, the length of the wick mesh $L_w$ and the length of the sheath U can be identical, or at least substantially identical. In alternative embodiments, the length of the wick mesh $L_w$ can be greater than the length of the sheath $L_s$. In one embodiment, the length of the wick mesh $L_w$ can be 90% the length of the sheath $L_s$. In one embodiment, the length of the wick mesh $L_w$ can be 85% the length of the sheath U. In one embodiment, the length of the wick mesh $L_w$ can be less 85% the length of the sheath $L_s$.

The sheath 206 can include different shapes, diameters, lengths, and sizes and can be manufactured to custom dimensions to create wicks of various sizes, shapes, and geometries. While the final size and shape of the wick is determined by the outside diameter or shape of the sheath 206, the final thickness of the wick is determined by the number of layers and thickness of the wick mesh 204. In one embodiment, the final thickness of the wick is determined by the number of times a wick mesh 204 has been wrapped about the mandrel 202, and/or the number of layers of wick mesh 204 utilized and the thickness of the wick mesh 204.

The sheath 206 is cold worked or drawn to provide extra strength to stop the mandrel 202 and wick mesh 204 from further deforming when compressed against the inner surface of the sheath 206. The sheath 206 can be fabricated out of any suitable material, such as copper, carbon steel, or any other suitable material that can stop further deformation of the mandrel 202 and wick mesh 204 upon pressure being applied to an inner surface of the sheath 206.

The forming assembly 200 can further include a first fitting 220. The first fitting 220 can include a first flange 222 and a first adapter 224. The first flange 222 can be slidable and/or positionable about a first end of the mandrel 202. As shown in FIGS. 2 and 3, the first adapter 224 can be threadably coupled with the first flange 222. Other suitable means of coupling the first adaptor 224 to the first flange 222 are contemplated by the present disclosure, such as with a quick connection or at latch, for example. In other embodiments, the first flange 222 and the first adapter 224 are of unitary construction. The connection between the first flange 222 and the first adapter 224 can provide a seal therebetween such that when a pressurized medium is applied through the first adapter 224 and the first flange 222, as will be described below, the pressurized medium does not leak out from between the first flange 222 and the first adapter 224. Other embodiments are envisioned where o-rings are used to further define a seal between the interfaces of the first flange 222 and the first adapter 224.

The first adaptor 224 can include a hydraulic opening 226 that can interface and/or couple with a source of pressure, such as a hydraulic pressure source. The source of pressure can supply a pressurized medium, such as hydraulic water or air, that passes through the first adaptor 224 and the first flange 222 and into the mandrel 202. The pressurized medium can pressurize the mandrel 202, causing the mandrel 202 and the wick mesh 204 to inflate, or hydraulically expand, toward the sheath 206. The source of pressure can pressurize the mandrel 202 with the pressurized medium until the mandrel 202 has compressed the wick mesh 204 into the sheath 206 and the mandrel 202 permanently deforms into the wick mesh 204.

The forming assembly 200 can further include a second fitting 230. The second fitting 230 can include a second flange 232, a second adapter 234, and a cap 236. The second flange 232 can be slid and/or positioned about the mandrel 202. The second adapter 234 can be coupled with the second flange 232 and the cap 236. As shown in FIGS. 2 and 4, the second adaptor 234 can be threadably coupled to the second flange 232 and the cap 236. Other suitable means of coupling the second adaptor 234 to the second flange 232 and the cap 236 are contemplated by the present disclosure, such as with a quick connection or at latch, as example. In other embodiments, the second flange 232 and the second adapter 234 are of unitary construction. The connections between the second flange 232, the second adapter 234, and the cap 236 can provide a seal such that when a pressurized medium flows through the second flange 232, the second adapter 234 and the cap 236, the pressurized medium does not leak out of the connections therebetween. Other embodiments are envisioned where o-rings are used to further define a seal between the interfaces of the second flange 232, the second adapter 234 and the cap 236.

Prior to pressurizing the mandrel 202, as discussed above, the cap 236 can be removed from the second adapter 234, allowing for venting of all gasses within the forming assembly 200. Once vented, the cap 236 can be recoupled to the second adapter 234 such that, when the pressurized medium is applied through the forming assembly 200 and the pressurized medium flows through the second fitting 230, the pressurized medium does not escape, allowing for the mandrel 202 to be pressurized.

As described above, the source of pressure can pressurize the mandrel 202 with the pressurized medium until the mandrel 202 has compressed the wick mesh 204 into the sheath 206 and the mandrel 202 permanently deforms into the wick mesh 204. Once sufficiently pressurized and deformed, the pressurized medium can be drained from the forming assembly 200. The mandrel 202, now permanently deformed, maintains the compression force against the wick mesh 204 and the sheath 206.

In preparation for diffusion bonding, the first fitting 220 and the second fitting 230 can be removed from the mandrel 202. In alternative embodiments, the first fitting 220 and second fitting 230 are not removed before diffusion bonding. In one embodiment, the first fitting 220 can be removed by cutting the mandrel 202 at a first cut point 240 and the second fitting 230 can be removed by cutting the mandrel 202 at a second cut point 242. The cut points 240, 242 are defined by gaps between ends of the sheath 206 and the fittings 220, 230. Once the first fitting 220 and the second fitting 230 are removed from the mandrel 202, the remaining, deformed mandrel 202, the wick mesh 204, and the sheath 206 are diffusion bonded at a high temperature (such as greater than or equal to about 900° C.) and at a low vacuum pressure. The mandrel 202 and the sheath 206 function as a support structure to maintain compression support on the wick mesh 204 to maintain the shape thereof during the diffusion bonding process. Once the diffusion bonding process is complete, the mandrel 202 and sheath 206 can be chemically dissolved/removed from the wick, as will be described in more detail below.

Figure 5:
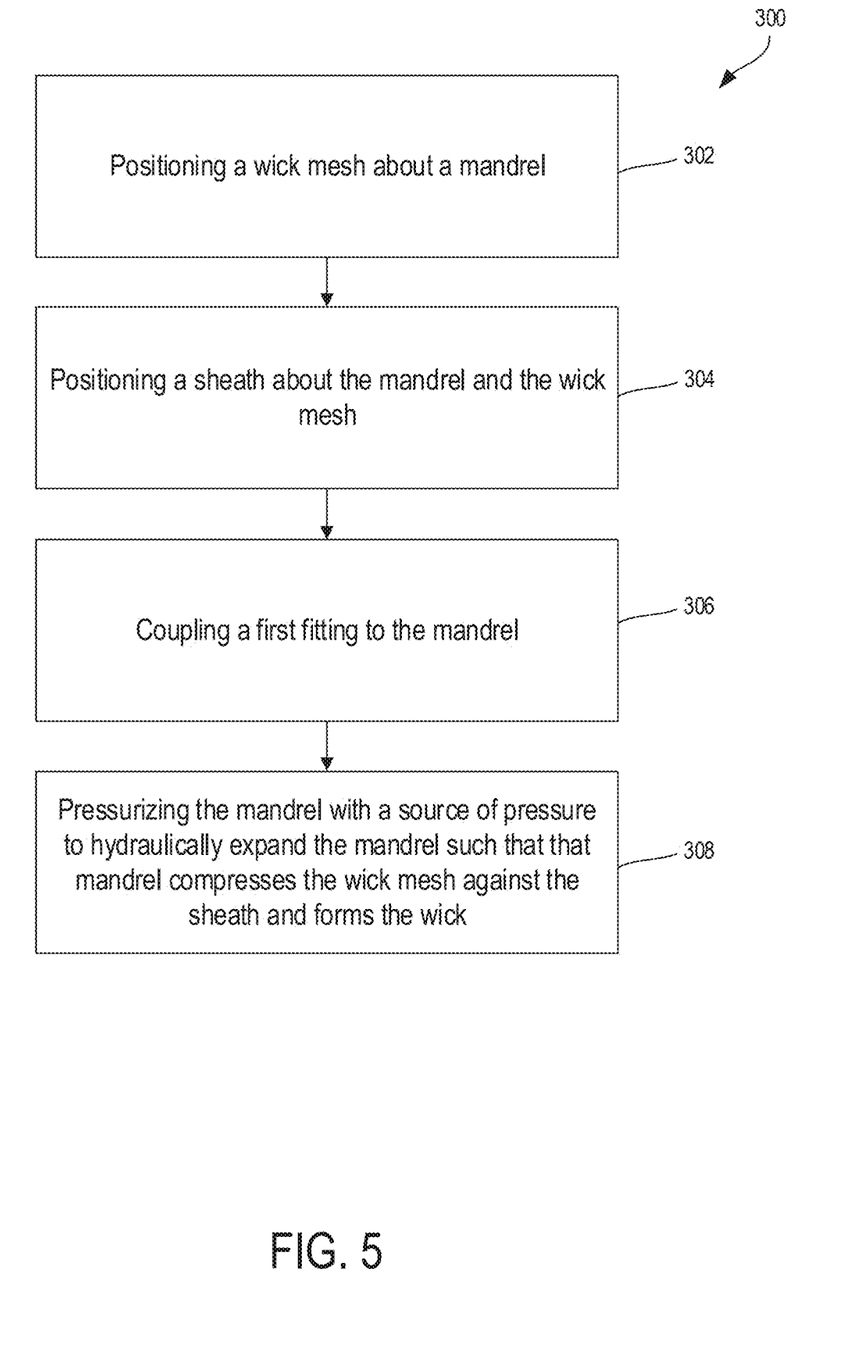
FIG. 5 illustrates a method of forming a wick using a mandrel, according to at least one aspect of the present disclosure.

Referring now to FIG. 5, a method 300 of forming a wick using a mandrel is disclosed, in accordance with at least one aspect of the present disclosure. The method 300 can include positioning 302 a wick mesh about the mandrel, positioning 304 a sheath about the mandrel and the wick mesh, and coupling 306 a first fitting to the mandrel. The first fitting can include an adapter that can couple with a source of pressure. The method 300 can further includes pressurizing 308 the mandrel with the source of pressure to hydraulically expand the mandrel such that that mandrel compresses the wick mesh against the sheath and forms the wick. The method 300 can optionally include pressurizing the mandrel such that the mandrel is permanently deformed into the wick. The method 300 can also optionally include depressurizing the mandrel and diffusion bonding the wick and the mandrel. The method 300 can also optionally include chemically removing the mandrel from the wick after diffusion bonding the wick and the mandrel. The method 300 can also optionally include coupling a second fitting to the mandrel and venting gas within the mandrel.

As discussed above, after the diffusion bonding process, the mandrel 202 and sheath 206 can be chemically dissolved and/or removed from the wick. The chemical dissolution/removal of the mandrel 202 and sheath 206 requires the use of specific chemicals depending on the material of the wick mesh 204. The chemical solution must react with the mandrel 202 and sheath 206 at a higher rate than with the wick mesh 204 to avoid damaging the wick during the removal process, thus, the material selection of the mandrel 202 and sheath 206 must consider specific chemicals required for removal and the chemicals ability to not damage the wick. As one example, the mandrel 202 and sheath 206 can be fabricated out of copper and the wick mesh 204 can be stainless steel. Nitric acid, as an example, was found to successfully remove the mandrel 202 and sheath 206 from the wick without significantly removing/damaging the wick.

The above-described forming assembly 202 and method is not limited to stainless steel wick meshes 204 and copper mandrels 202 and sheaths 206. As an example, in one embodiment, the wick mesh 204 can be fabricated out of molybdenum. When utilizing a molybdenum wick mesh 204, the material of the mandrel 202 and sheath 206 would need to be selected considering chemical dissolution/removal factors, discussed above, as well as considering the higher diffusion bonding temperatures for molybdenum. As one example, when utilizing a molybdenum wick mesh 204, a carbon steel mandrel 202 and sheath 206 can be utilized. Although different mandrels 202 and sheaths 206 are required for different wick meshes, the process of manufacturing the wick, discussed above, does not change.

The forming assembly 200 described herein allows for forming wicks at many different sizes and shapes with minimal cost differences. The forming assembly only requires selection of a different mandrel and/or sheath tube, thus giving flexibility to make wicks of different materials, shapes, and sizes quickly as microreactor designs change. The forming assembly has been found to produce a permanently deformed wick containing uniform pore sizes, as confirmed by bubble tests. The forming assembly 200 and associated steps described above produce a wick which, after diffusion bonded, has been tested and proven to contain the proper dimensions (outside diameter, thickness), tolerances (approximately ±0.001 inch diameter), pore size and strength required to be utilized in a heat pipe. The forming assembly 200 and associated steps has also been proven to be highly repeatable through multiple trials.

The forming assembly 200 allows for formation of wicks at many different sizes with minimal cost difference as the forming device only requires selection of a different mandrel 202 and sheath 206, thus giving the flexibility to make wicks of different materials, shapes, and sizes quickly as the microreactor design changes.

Various aspects of the subject matter described herein are set out in the following examples.

Example 1—A forming assembly for forming a wick, comprising a tube inflatable to an inflated configuration. A wick mesh is configured to be wrapped about the tube. The forming assembly further comprises a sheath positionable about the tube and the wick mesh.

The tube and the sheath are configured to compress the wick mesh and form the wick based on the tube inflating towards the inflated configuration.

Example 2—The forming assembly of Example 1, wherein the tube comprises an annealed tube.

Example 3—The forming assembly of Examples 1 or 2, wherein the sheath comprises a cold drawn sheath.

Example 4—The forming assembly of any one of Examples 1-3, wherein the sheath is configured to define an outside diameter of the wick.

Example 5—The forming assembly of any one of Examples 1-4, further comprising a first fitting couplable with the tube. The first fitting comprises an adapter couplable with a source of pressure.

Example 6—The forming assembly of Example 5, wherein the source of pressure is configured to pressurize the tube to transition the tube towards the inflated configuration to compress the wick mesh against the sheath.

Example 7—The forming assembly of Example 6, wherein the tube maintains the wick mesh compressed against the sheath as the source of pressure depressurizes the tube.

Example 8—The forming assembly of any one of Examples 1-7, further comprising a second fitting couplable with the tube, wherein the second fitting comprises a vent.

Example 9—A method of forming a wick using a mandrel, the method comprising positioning a wick mesh about the mandrel, positioning a sheath about the mandrel and the wick mesh, and coupling a first fitting to the mandrel. The first fitting comprises an adapter configured to couple with a source of pressure. The method further includes pressurizing the mandrel with the source of pressure to hydraulically expand the mandrel such that that mandrel compresses the wick mesh against the sheath and forms the wick.

Example 10—The method of Example 9, further comprising pressurizing the mandrel such that the mandrel is permanently deformed into the wick.

Example 11—The method of Examples 9 or 10, further comprising depressurizing the mandrel and diffusion bonding the wick and the mandrel.

Example 12—The method of Example 11, further comprising chemically removing the mandrel from the wick after diffusion bonding the wick and the mandrel.

Example 13—The method of any one of Examples 9-12, further comprising coupling a second fitting to the mandrel and venting gas within the mandrel.

Example 14—A forming assembly for forming a wick, comprising an inner enclosure hydraulically expandable to an expanded configuration. A wick mesh is configured to be wrapped about the inner enclosure. The forming assembly further comprises an outer enclosure positionable about the inner enclosure and the wick mesh. The inner enclosure and the outer enclosure are configured to compress the wick mesh and form the wick based on the inner enclosure hydraulically expanding towards the expanded configuration.

Example 15—The forming assembly of Example 14, wherein the inner enclosure comprises an annealed tube.

Example 16—The forming assembly of Examples 14 or 15, wherein the outer enclosure comprises a cold drawn tube.

Example 17—The forming assembly of any one of Examples 14-16, wherein the outer enclosure is configured to define an outside diameter of the wick.

Example 18—The forming assembly of any one of Examples 14-17, further comprising a first fitting couplable with the inner enclosure, wherein the first fitting comprises an adapter couplable with a source of pressure.

Example 19—The forming assembly of Example 18, wherein the source of pressure is configured to pressurize the inner enclosure to hydraulically expand the inner enclosure towards the expanded configuration to compress the wick mesh against the outer enclosure.

Example 20—The forming assembly of Example 19, wherein the inner enclosure maintains the wick mesh compressed against the outer enclosure as the source of pressure depressurizes the inner enclosure.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"): the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A. B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B. or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially". "about", or "approximately" means within 50%, 20%, 15%, 10% 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A forming assembly for forming a wick, comprising:
   a tube inflatable between an uninflated configuration and an inflated configuration;
   a wick mesh wrapped about the tube, wherein the wick mesh contacts the tube in the uninflated configuration; and
   a sheath positionable about the tube and the wick mesh, wherein the tube and the sheath are configured to compress the wick mesh and form the wick based on the tube inflating towards the inflated configuration.

2. The forming assembly of claim 1, wherein the tube comprises an annealed tube.

3. The forming assembly of claim 1, wherein the sheath comprises a cold drawn sheath.

4. The forming assembly of claim 1, wherein the sheath is configured to define an outside diameter of the wick.

5. The forming assembly of claim 1, further comprising a first fitting couplable with the tube, wherein the first fitting comprises an adapter couplable with a source of pressure.

6. The forming assembly of claim 5, wherein the source of pressure is configured to pressurize the tube to transition the tube towards the inflated configuration to compress the wick mesh against the sheath.

7. The forming assembly of claim 6, wherein the tube maintains the wick mesh compressed against the sheath as the source of pressure depressurizes the tube.

8. The forming assembly of claim 1, further comprising a second fitting couplable with the tube, wherein the second fitting comprises a vent.

* * * * *